United States Patent Office 3,700,619
Patented Oct. 24, 1972

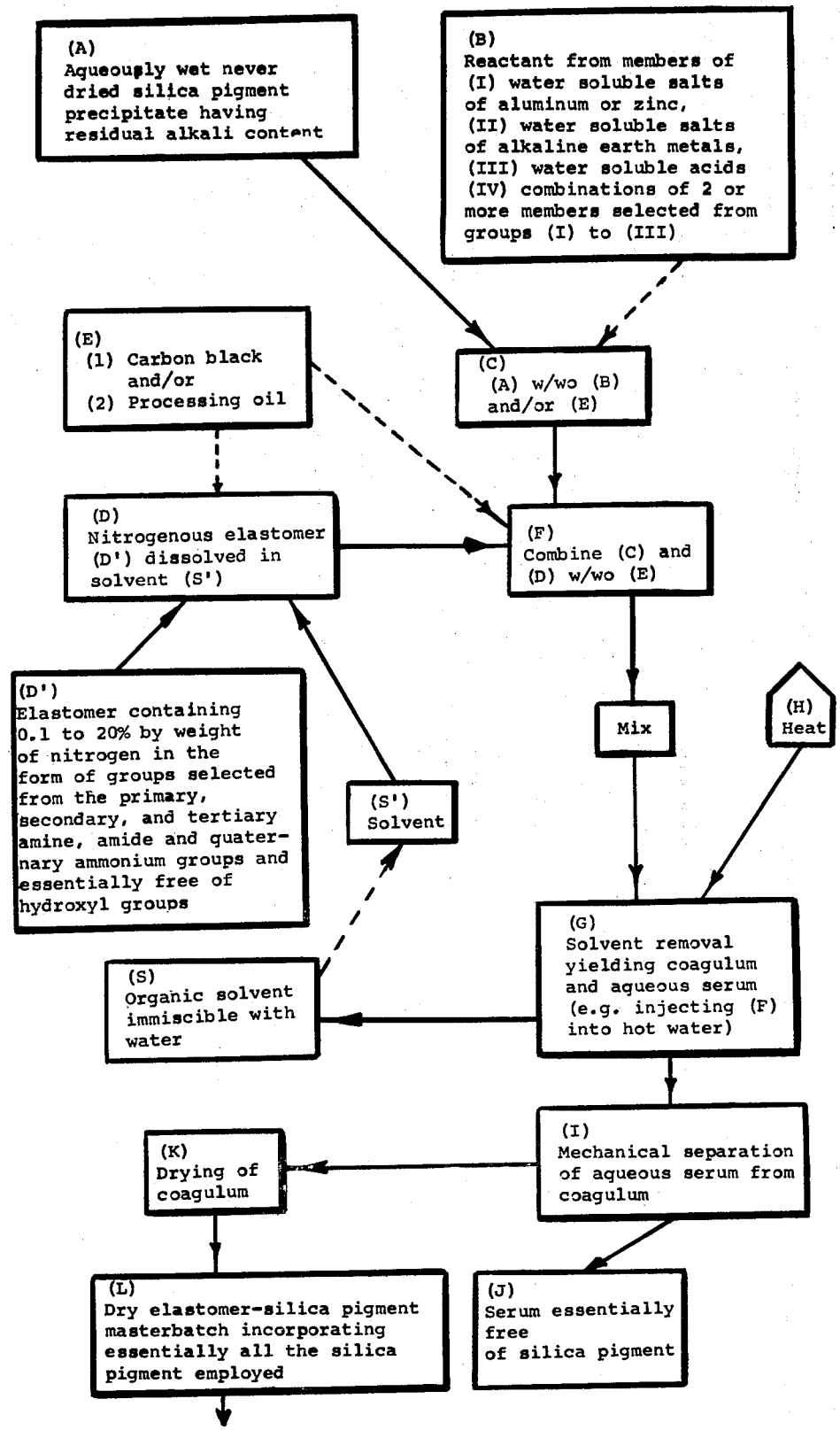

3,700,619
ELASTOMER-SILICA PIGMENT MASTERBATCHES AND PRODUCTION PROCESSES RELATING THERETO
Oliver W. Burke, Jr., Fort Lauderdale, Fla.
(1510 SW. 13th Court, Pompano Beach, Fla. 33061)
Continuation-in-part of applications Ser. No. 798,215 and Ser. No. 798,216, both Sept. 16, 1968, now abandoned, which are divisions of application Ser. No. 611,250, Jan. 24, 1967, now Patent No. 3,523,096, which in turn is a continuation-in-part of applications Ser. No. 458,379 and Ser. No. 458,420, both May 24, 1965, both now abandoned, and Ser. No. 479,806, Aug. 16, 1965, now Patent No. 3,401,017. This application July 16, 1970, Ser. No. 55,472
Int. Cl. C08c 11/10; C08k 1/08
U.S. Cl. 260—33.6 AO        9 Claims

ABSTRACT OF THE DISCLOSURE

Curbing of silica pigment losses and the promotion of uniformity of product in the preparation of an elastomer-silica pigment masterbatch are effected (a) by combining (1) an aqueous slurry of hydrated silica pigment precipitate which has a bound alkali content, which has been prepared by precipitation from an aqueous alkali metal silicate solution, and which has been continuously kept in an aqueously wet state without having been dried after its precipitation—with or without addition in aqueous solution of (2) reactant selected from the members of Group (I) the water soluble salts of aluminum and zinc, Group (II) the water soluble salts of alkaline earth metals, Group (III) the water soluble acids and Group (IV) combinations of any two or more of the foregoing members—with (b) an organic solvent dispersion of elastomer consisting essentially of nitrogenous polymer containing 0.1 to 20% of nitrogen in the form of groups selected from the class consisting of amide primary, secondary and tertiary amine, and quaternary ammonium groups—with or without (3) carbon black and/or processing oil—and (b) removing the solvent and aqueous phase and recovering the resulting combination as a masterbatch. New products prepared by the process are also claimed.

CROSS REFERENCE TO RELATED APPLICATIONS

This application is a continuation-in-part of copending applications Ser. Nos. 798,215 and 798,216, filed Sept. 16, 1968, now abandoned as divisions of application Ser. No. 611,250, filed Jan. 24, 1967, now U.S. Pat. 3,523,096 said application Ser. No. 611,250 having been a continuation-in-part of earlier applications Ser. No. 458,420, filed May 24, 1965, (now abandoned); Ser. No. 458,379, filed May 24, 1965, (now abandoned); and Ser. No. 479,806, filed August 16, 1965, (now U.S. Patent 3,401,017), the disclosures of all of which are incorporated herein by reference.

BACKGROUND OF THE INVENTION

(1) Field of the invention

The field to which this invention pertains is the preparation of masterbatches from solvent dispersions of elastomers and aqueous slurries of precipitated silica pigment.

BRIEF DESCRIPTION OF THE DRAWING

The single figure of the drawing is a block-diagram illustrative of the process aspect of the invention.

SUMMARY OF THE INVENTION

It is known to those skilled in the art to prepare hydrated silica pigment for the reinforcement of rubber by precipitation from aqueous solutions of alkali metal silicates with the aid of carbon dioxide, and to carry out such precipitation in manners to avoid the formation of gelatinous masses—(i.e. the formation of silica gel)—and to promote the precipitation of a silica pigment in finely divided form (i.e. in particles in the reinforcing size range of about 0.015 to about 0.150 microns, preferably 0.02 to 0.06 microns) and to recover the pigment from the resulting wet silica pigment by filtration, washing and drying.

The wet silica pigments formed by precipitation from alkali metal silicate solutions with the aid of carbon dioxide have a bound alkali content in the range of about 0.1 to 10% by weight as $Na_2O$, and upon being dried in this state form aggregates, from the pigment particles of reinforcing size, which aggreates are of much greater than reinforcing size and will not adequately disperse (i.e. break down into particles of reinforcing size) when incorporated into rubber either by dry compounding or latex compounding.

When one treats such alkaline wet silica pigments with water soluble salts of alkaline earth metals, e.g. calcium salts, to substantially replace the bound alkali metal of the silica, the resulting pigment, when dried, still evidences the formation of aggregates of greater than reinforcing size, which do not adequately disperse in the rubber.

When one treats the alkaline wet silica pigments with the water soluble salts of aluminum and/or zinc, to substantially replace the alkali metal content thereof, the resulting acidic pigment, when dried, disperses to a greater extent in rubber, evidencing less aggregation than the neutral and alkaline products referred to above.

Finally, when one renders the wet silica pigment strongly acidic, by treatment with sulfuric acid and drying, the resulting strongly acidic product is more readily dispersible in rubber, and exhibits minimum aggregation; however, such highly acidic pigments are not practicable for use in the reinforcement of rubbers, since their acidity adversely effects vulcanization thereof.

Thus the drying of the wet silica pigment in alkaline, neutral, and moderately acidic states, in each instance causes the formation of aggregates of pigment particles to a greater or lesser degree which aggreation prevents adequate dispersion of the dry pigment in the rubber; the formation of these aggregates by the drying of the pigment is irreversible; and they remain mostly as aggregates that do not disperse in the rubber either by dry compounding or latex compounding.

This invention is based on the premise that uniformity of an elastomer-pigment masterbatch depends both on obtaining incorporation of a measured quantity of pigment in the masterbatch (e.g. avoiding loss of pigment in the serum in wet masterbatching) and adequate dispersion of the pigment in the elastomer in particles of reinforcing size (e.g. minimizing the pigment aggregation problem); and the present invention provides a process for accomplishing these ends by forming the masterbatch from aqueously wet hydrated silica pigment precipitate having a bound alkali content of 0.1 to 10% by weight as $Na_2O$; which has been prepared by precipitation from an aqueous solution of alkali metal silicate with the aid of carbon dioxide; and which has continuously been maintained in an aqueously wet state after its precipitation without having been dried therefrom; and which is combined with an elastomer dispersion in the still aqueously wet state, with special provisions for avoiding loss of pigment in the aqueous serum and promoting uniformity of product in the masterbatch.

Thus the present invention provides a simple and efficient process for the curbing of silica pigment losses and the promotion of uniformity of product in the preparation of masterbatches of measured silica pigment content. This process employs a solvent dispersion of elastomer and an aqueous slurry of low cost precipitated silica pigment having a bound alkali content. As shown in the drawing, the process consists essentially in (A) Providing 5 to 100 parts by weight, dry basis, of aqueously wet hydrated silica pigment precipitate which has a bound alkali content in the range of 0.1 to 10% by weight as $Na_2O$; which has been prepared by precipitation from an aqueous solution of alkali-metal silicate with the aid of carbon dioxide; and which has continuously been maintained in an aqueously wet state without having been dried therefrom after its precipitation;

(B) Providing, when used in step (C), reactant selected from the class consisting of the members of the following groups: Group (I), the water soluble salts of aluminum or zinc; Group (II), the water soluble salts of the alkaline earth metals; Group (III), the water soluble acids; and Group (IV), combinations of any two or more members of the foregoing groups;

(C) Combining the wet silica pigment provided by step (A) with from 0 to at least a stoichiometric equivalent, based on the alkalinity of the silica pigment, of reactant provided by step (B); thereby to provide a wet silica pigment for use in step (F);

(D) Providing an organic solvent dispersion containing 100 parts, dry basis by weight, of nitrogenous elastomer, said elastomer (D′) containing 0.1% to 20% by weight of nitrogen in the form of substituent groups selected from the primary amine, secondary amine, tertiary amine, quaternary ammonium, and amide groups and being essentially free of hydroxyl groups; and said solvent (S′) being essentially water immiscible;

(F)–(F′) Intimately mixing (1) the wet silica pigment provided by step (A), (2) from 0 to 75 parts by weight of carbon black—from (E)—with the limitation that the total of silica pigment and carbon black, dry basis, not exceed 80 parts by weight and (3) from 0 to 45 parts by weight of processing oil—from (E)—, and (4) the solvent dispersion of nitrogenous elastomer provided by step (D), and (G)–(L) Separating the volatiles from the resulting masterbatch, e.g. by volatilizing the solvent as at (G) followed by mechanical separation of the aqueous silica from the coagulum as at (I), and washing and drying of the coagulum as at (K) to yield the masterbatch (L).

Under these conditions the steps prior to the recovery render the serum resulting from the coagulation essentially free of silica pigment, thus assuring a uniform silica pigment content in the masterbatch. The achievement of this desideratum is evidenced by the fact that when the coagulum is mechanically removed from the serum, the serum is found to be essentially free of silica pigment, as indicated at (J) in the drawing.

In particular embodiments of the invention the silica pigment may be treated with reactant (B) before blending with the nitrogen group containing elastomer (D), and may be combined therewith in alkaline, essentially neutral, or acidic form, and the elastomer may contain particular ones of the designated nitrogen groups, and in the following description of preferred embodiments, Examples 1–9, 19–25, 45–48, 53–56, 65–66, 71–73, 78–81, and 86–89 disclose suitable procedures for preparing the aqueous dispersion or latex of amine, amide or quaternary ammonium group containing interpolymers including copolymers and graft polymers; and Examples 10–18, 26–44, 49–52, 57–64, 67–70, 74–77, 82–85 and 90–101 illustrate the practice of the invention with aqueous dispersions of polymers and treated and untreated wet silica pigments.

The nitrogenous elastomer (D) is dissolved in solvent—which may be recycled solvent (S)—and said solvent itself, or as an azeotrope with water, preferably has a boiling point lower than that of water at atmospheric pressure, and the viscosity of the elastomer-solvent dispersion (i.e. solution) preferably is selected in the range of 5,000 to 50,000 centipoises, to facilitate the intimate mixing of the nitrogenous elastomer-solvent solution and the treated or untreated silica pigment aqueous slurry.

The silica-elastomer masterbatch recovery is effected by separating the volatiles from the coagulum, preferably in two steps (G) and (I) when the solvent or its aqueous azeotrope can be volatilized in step (G) prior to separation of the solids from the remaining aqueous phase in step (I). The volatilizing of the solvent, step (G) to convert the mixture (F, F′) to coagulum and aqueous serum may be effected by running the dispersion (from F) into hot water. The greater part of the separation of the coagulum from the aqueous serum in step (I) is preferably effected by mechanical dewatering, e.g. filtration, decanting, centrifuging, etc., to reduce the heat required for final drying (K) of the masterbatch (L). The serum removed by mechanical de-watering is found to be essentially free of silica pigment as indicated at (J) in the drawing and the dry elastomer-silica pigment masterbatch (L) thus incorporates essentially all of the silica pigment employed (in F). The process thus curbs silica losses and assures a uniform silica pigment content in the masterbatch.

In different embodiments or species the invention is applicable to producing masterbatches from the aqueous slurry of silica pigment with various categories of the nitrogenous elastomer or combinations thereof, containing from 0.1 to 20%, preferably ½ to 5%, of nitrogen, by weight, in the form of primary and/or secondary and/or tertiary amine groups and/or quaternary ammonium groups. In these several categories the dispersion (i.e. solution) of elastomer may have a concentration of from 5 to 50%, preferably 10 to 30%, dry solids by weight. Thus:

(1) In a first embodiment the invention provides a masterbatch from (a) aqueous silica slurry and (b) a soltuion of nitrogenous elastomer which has been prepared (1) by emulsion polymerization (2) of ethylenically unsaturated monomer material having amide and/or primary, secondary, and/or tertiary amine and/or quaternary ammonium groups with (3) other ethylenically unsaturated elastomer forming monomer material, e.g. conjugated diene monomer material such as butadiene, isoprene, chloroprene and the like, alone or in various combinations with each other and/or with other vinylidine monomer material copolymerizable therewith e.g. styrene, acrylonitrile, etc.

(2) In a second embodiment, the invention provides a masterbatch from (a) aqueous silica pigment slurry and (b) a solution of a nitrogenous graft polymer which has been prepared from a precursor elastomer in latex form by latex grafting with the ethylenically unsaturated monomer material having primary and/or secondary and/or tertiary amine and/or quaternary ammonium groups and/or amide groups.

(3) In a third embodiment, the invention provides a masterbatch from (a) aqueous silica pigment slurry and (b) a solution of graft polymer elastomer which has been prepared from a precursor polymer in solution form, by solution grafting with the ethylenically unsaturated monomer material having amide and/or primary, secondary and/or tertiary amine groups and/or quaternary ammonium groups, the precursor elastomer grafted in solution being one which was prepared by aqueous emulsion polymerization.

(4) In a fourth embodiment, the invention provides a masterbatch from (a) aqueous silica slurry and (b) a solution of graft polymer elastomer which was prepared from a precursor polymer in solution form, by solution grafting with the ethylenically unsaturated monomer material having amide and/or primary, secondary and/or tertiary amine and/or quaternary ammonium groups, the precursor elastomer itself having been prepared by anhydrous solution polymerization.

For convenience of reference and comparison, the foregoing embodiments or species are tabulated in Table A, which shows: Species I(A) in which the amine group containing monomer is copolymerized with elastomer forming monomer or monomer mixture, e.g. by emulsion polymerization (Col. 2) with conventional catalysts therefore, and the resulting elastomer solids are recovered and dissolved to form a solution (Col. 5) of the nitrogenous elastomer. Species I(Q) which the nitrogen group is a quaternary ammonium group derived either (a) by similarly emulsion copolymerizing an ethylenically unsaturated quaternary ammonium group containing monomer; or (b) by similarly emulsion copolymerizing a tertiary amine group containing monomer—as in I(A), Col. 2—and quaternizing the resulting elastomer in the aqueous phace (Col. 4); or (c) by similarly emulsion copolymerizing a tertiary amine group containing monomer and recovering and dissolving the resulting precursor polymer—as in I(A), Cols. 2 and 5—and quaternizing the tertiary amine elastomer in the solution (Col. 8). Species II(A), wherein a precursor homopolymer or copolymer elastomer latex is prepared, e.g. by emulsion polymerization (Col. 1 or 2), latex grafted with amine monomer (Col. 3) and recovered and dissolved (Col. 5) to form the nitrogenous elastomer solution. Species II(Q), wherein the precursor polymer is prepared and grafted in the same manner—as in II(A)—but with a quaternary ammonium monomer (Col. 3), or with a tertiary amine monomer (Col. 3) followed by quaternizing in the latex state (Col. 4), or with a tertiary amine monomer (Col. 3) followed by recovery, solvation, and quaternizing in solution (Col. 8). Species III(A) and (Q), wherein the precursor polymers are formed by emulsion polymerization (Cols. 1 or 2), and are recovered and dissolved in solvent (Col. 5) and then grafted in solution with the amine or quaternary ammonium monomer (Col. 7), or alternatively with the tertiary amine monomer (Col.7), followed by quaternization thereof in solution (Col. 8). Species IV(A) and (Q), wherein the elastomer, e.g. butyl rubber, or ethylene-propylene elastomer, or the like, is prepared in a solution polymerization (Col. 6), and grafted in solution (usually in a different solvent) with the amine or quaternary ammonium monomer (Col. 7), or altarnetively with the tertiary amine monomer (Col. 7) followed by quaternizing thereof in solution (Col. 8).

formation of masterbatches therewith with solvent dispersions of certain nitrogenous elastomers.

Elastomers

To maintain clear lines of division from other copending applications, the elastomer solutions employed in the present invention are limited to those prepared from $C_3$ to $C_{20}$ ethylenically unsaturated monomers with amide, amine or quarternary ammonium groups with or without other $C_2$ to $C_{20}$ ethylenically unsaturated monomers copolymerized or graft polymerized therewith, and exclude solutions of elastomeric polymers not having such groups, or having such groups in combination with hydroxyl groups.

Among the nitrogenous elastomers especially suitable for use in preparing the silica containing masterbatch are the butadiene copolymers of the aminoacrylates and the vinyl pyridines with or without other vinylidene (including vinyl) monomers such as: the butadiene/2-vinyl pyridine copolymers, the butadiene/4-vinyl pyridine copolymers, the butadiene/2-methyl-5-vinyl pyridine copolymers, the butadiene/diethylaminoethyl methacrylate copolymers, the butadiene-dimethylaminoethyl acrylate copolymers, the butadiene/styrene/monoalkylaminoalkyl and dialkylaminoalkyl acrylate and methacrylate copolymers, the butadiene/acrylonitrile/vinyl pyridine copolymers, the butadiene/acrylonitrile/alkylaminoalkyl acrylate and methacrylates and such polymers in which the amine monomer is replaced with an amide monomer such as acrylamides or methacrylamide.

When the nitrogenous elastomer contains tertiary amine groups, such groups may be quaternized as aforesaid.

The precursor elastomers which can be grafted and employed in solution in accordance with the present invention include diene homopolymer rubbers such as polybutadiene, polyisoprene, polychloroprene; diene copolymer rubbers such as the copolymers of diene monomers and monomers containing and copolymerizable therewith through a single ethylenically unsaturated group, e.g. butadiene-styrene, butadiene-acrylonitrile or methacrylonitrile, butadiene-acrylates or methacrylates; and rubbery copolymers of hydrocarbon monomers with polar vinylidene (including vinyl) monomers, as well as mixtures and combinations thereof (excluding hydroxy monomers).

Precursor polymers prepared by solution polymerization and suitable for preparation of the graft nitrogenous polymers include but are not limited to elastomers prepared in anhydrous solvent systems, e.g. with the aid of

TABLE A

Categories of Nitrogenous Elastomer Preparations [a]

| | Aqueous polymerization (latex) | | | | Solution | | |
|---|---|---|---|---|---|---|---|
| Categories | Homo-polymer (1) | Co-polymer (2) | Grafting monomer (3) | Quaternizing (4) | Emulsion polymer (5) [b] Anhydrous polymer (6) [c] | Grafting monomer (7) | Quaternizing (8) |
| I(A) | | Amine | | | (5) | | (8) |
| I(Q) | | Quaternary | | | (5) | | (8) |
| II(A) | (1) or— | (2) | (3)—Amine | (4) | (5) | | (8) |
| II(Q) | do | (2) | (3) | (4) | (5) | | (8) |
| | | | | | Anhydrous polymerization | | |
| III(A) | do | (2) | | | (5) | (7)—Amine | (8) |
| III(Q) | do | (2) | | | (5) | (7)—Quaternizing | (8) |
| IV(A) | | | | | (6) | (7)—Amine | (8) |
| IV(Q) | | | | | (6) | (7)—Quaternizing | (8) |

[a] Polymers containing amide groups may be prepared in a manner like those containing amine groups.
[b] Prepared by emulsion polymerization.
[c] Prepared by anhydrous polymerization.

DESCRIPTION OF THE PREFERRED EMBODIMENTS

Preferred embodiments of the present invention avoid the use of organic additives such as tetraethylene pentamine, glue, gelatin, casein, etc., which increase the cost and may effect the curing properties of the masterbatch. The invention generally may be used to improve wet silica masterbatching and masterbatches using any alkaline slurry of wet silica pigment containing bound alkali which has not been subjected to drying, and is applicable to the catalyst systems employing metal alkyls and/or transition metal halides. In certain of these systems after the polymerization of the olefin and/or diolefin is complete and the catalyst has been removed, the elastomer is already in solvent solution or can readily be transferred to a solvent solution suitable for grafting with the nitrogenous monomers to yield the graft nitrogenous polymers employed in the practice of this invention. Such precursor polymers prepared by solution polymerization include, but are not limited to, elastomers from olefins and/or cyclic olefins and/or cyclic diolefins and/or dicyclic diolelns including ethylene-propylene copolymers, ethylene-propylene terpolymers, ethylene-butylene copolymers and terpolymers, and butadiene-monoolefin interpolymers and the like.

The elastomers prepared by free radical catalyzed polymerization, e.g. by emulsion polymerization, can have the nitrogenous groups introduced thereinto by graft polymerization to the precursor polymer; or may be initially formed as nitrogen containing polymers by copolymerization with the nitrogenous monomers. The elastomers prepared by anhydrous solution polymerization, e.g. using Ziegler type catalyst, can be grafted with the nitrogenous monomers, in solution, with the aid of free radical catalysts.

Nitrogenous polymer solvents

In the practice of this invention the nitrogenous polymer is in solution. It is often necessary to employ a solvent system to dissolve the said polymers as for example toluene and butanol. Certain polar solvents such as alcohols have the ability to hydrogen bond with amine or quaternary ammonium groups and thus break up the intermolecular hydrogen bonding of the polymer molecules and permit solution in a solvent such as toluene. In selecting the solvent the volatile hydrocarbon or halohydrocarbon, or halocarbon solvents are desirable, e.g.: butane, pentane, hexane, cyclohexane, methylene chloride, carbon tetrachloride, and the like.

Monomers

Typical of the primary, secondary and tertiary $C_3$ to $C_{20}$ amine monomers which may be employed for forming nitrogenous elastomer, e.g. by emulsion copolymerization or by emulsion or solution graft polymerization, are: the amino olefinic ethers, such as the amino vinyl ethers including aminoethylvinyl ether, N-ethylaminoethylvinyl ether, aminopropylvinyl ether, N-methylaminoethylvinyl ether, N,N-diethylaminoethylvinyl ether and the like; the olefinic amines, such allyl amines as N,N-dimethyl allylamine, N,N-diethyl, dipropyl, dibutyl, diisobutyl, diphenyl and similar allylamines and N-allyl morpholine, N-allyl-pyridine, N-allyl-ethyleneimine and the like; basic nitrogen containing esters of olefinic acids, such as aminocyclohexyl methacrylate, β-piperidyl-N-ethyl methacrylate, β-morpholine-N-ethyl methacrylate, N-methacrylyl morpholine, N-methacrylyl thiomorpholine, N-methacrylyl piperidines, N-acrylyl morpholine, N-acrylyl thiomorpholine, N-acrylyl piperidine and the like; the acrylamino substituted acrylic and α and β-acrylic acid esters, such as the methyl, ethyl, propyl and the like alkyl esters of α-acetoacrylate, α-N-butylaminoacrylate and the like; the vinyl pyridines, such as 2-vinyl pyridine, 3-vinylpyridine, 4-vinylpyridine, 2-vinyl-5-ethyl pyridine, 2-methyl-5-vinylpyridine and the other ethyl and methyl isomers of vinylpyridine and the like.

Typical of the quaternary ammonium compound monomers are quaternization products of the above exemplified tertiary amines, obtained by reacting such amines with methyl chloride, methyl bromide, benzyl chloride, benzyl bromide, and other allyl and aryl halides, sulfonates, phosphates, and the like, e.g. toluene sulfate; examples of which include methacryloxyethyltrimethylammonium methylsulfate, β-dimethylaminoethyl methacrylate, methyl α-diethylaminoacrylate, methyl α-(N-methylanilino)-acrylate, methyl α-dibenzylaminoacrylate, methyl α-distearylaminoacrylate and the like.

Typical of the ethylenically unsaturated $C_3$-$C_{20}$ amide monomers which may be employed in forming the copolymer or graft polymer elastomer employable in the present invention are the amides of acrylic acid and α- and β-substituted acrylic acids such as acrylamide, N-methylacrylamide, N-methylmethacrylamide, N-ethylacrylamide, N-ethylmethacrylamide, N-propylacrylamide, N-propylmethacrylamide, N-isopropylacrylamide, N-isopropylmethacrylamide, N-t.-butylacrylamide, N-t.-butyl-methacrylamide, N-amylacrylamide, N-amylmethacrylamide, N-t.-octylacrylamide, N-decylacrylamide, N-phenylacrylamide, N-phenylmethacrylamide, N-o-tolylacrylamide, N-p-tolylacrylamide, N-naphthylacrylamide, N,N-dimethylacrylamide, N,N-diethylmethacrylamide, N,N-diethylacrylamide, N,N-dimethylacrylamide, N,N-methylethylacrylamide, N,N - ethylmethylmethacrylamide and other N- mono- and N,N-di-substituted unsaturated acid amides, e.g. where the substituent is alkyl $C_1$ to $C_{12}$, haloalkyl and the like.

Typically of the conjugated diene monomers which can be employed to form the copolymers or graft polymers used herein are the $C_4$ to $C_8$ hydrocarbon conjugated diene monomers such as butadiene-1,3, isoprene, piperylene, the hexadienes including 2,3-dimethylbutadiene, the halogen substituted $C_4$ to $C_8$ conjugated dienes such as chloroprene, the cyano substituted $C_4$ to $C_8$ conjugated dienes such as 2-cyanobutadiene and the like.

In various of the examples, which are illustrative but not restrictive of the invention: (a) the hydrated silica pigment has a bound alkali content in the range of 0.1 to 10% by weight as $Na_2O$ and has been prepared by precipitation from an aqueous solution of alkali metal silicate with the aid of carbon dioxide and said silica precipitate has been continuously maintained in the aqueous phase without having been dried after its precipitation; (b) the aqueous silica pigment is combined with from 0 to at least a stoichiometric equivalent based on the alkalinity of the silica pigment slurry, of reagent selected from the class consisting of the members of Group (I) the water soluble salts of aluminum or zinc; Group (II) the water soluble salts of the alkaline earth metals; Group (III) the water soluble acids and Group (IV) combinations of any two or more of such members.

The term "water soluble acids" as used herein designates the inorganic and organic acids which are water soluble both as free acids and in the form of alkali metal or ammonium salts. Examples of such acids are hydrochloric, sulfuric, nitric, phosphoric, formic, acetic, hydroxyacetic, the chloroacetic acids, propionic, oxalic, tartaric, citric, maleic, and the like.

In the examples, the combination of nitrogenous elastomer-solvent dispersion and silica pigment slurry was effected by intimate mixing in the high speed, high shear Waring Blendor. The removal of solvent from the intimate mixture was accomplished by dropping the said mixture into boiling water and the volatile solvent readily boiled off leaving a wet coagulum or wet crumb in the aqueous serum, which serum was free of silica or essentially free of silica.

Silica pigments containing residual alkali suitable for masterbatching in accordance with the present invention are usually precipitated by the gradual acidulation with the aid of carbon dioxide of aqueous sodium silicate solution.

Carbon black

By the term "carbon black" as used herein is meant any carbon blacks suitable for use by the rubber industry and set forth under the title "carbon blacks" at pages 251 and 264 of the publication entitled "Materials and Compounding Ingredients for Rubber," compiled by J. V. Del Gatto, published by Rubber World, 1968, and herein incorporated by reference, e.g. Philblack O (TM), Statex K (TM), Statex 160 (TM), Kosmobile 77 (TM), Thermax (TM), and the like.

Processing oils

The term "processing oils" as used herein is meant rubber processing material of both liquid and solid types (if required the solids types can be converted to the liquid state for use herein with the aid of solvent or plasticizer) and include the processing materials set forth under "Plasticers and Softeners" at pages 149 to 214 of the publication entitled "Materials and Compounding Ingredients for Rubber," compiled by J. V. Del Gatto, published by Rubber World, 1968, and herein incorporated by reference and among the types of processing materials especially suitable for use in this invention are (a) the coal tar oils and pitches e.g. Bardol (TM), Bardol B (TM); (b) the asphalts, e.g. BRH #2 (TM); (c) the petroleum oils including the paraffinic, naphthenic, aromatic, and highly aromatic categories, which are commercially available under trademark designations, Sunpar (TM), Sundex (TM), Sunthene (TM), Circosol (TM), and Shellflux (TM) oils, and the like, such as Circosol 2XH (TM), Sundex 53 (TM), Shell SPX 97 (TM), Dutrex-20, -419, -726, -757, -787 (TM), and Califlux TT (TM) and other oils suitable for rubber compounding or the oil extension of synthetic rubber; (d) the coumarone-indene oils and resins, e.g. Cumar Resin RH, -P10, -T (TM); (e) the liquid ester type plasticizers, e.g. dibutyl phthalate, di-(2-ethylhexyl) phthalate, diglycol laurate, dibenzyl sebacate, tributoxyethyl phosphate, tricresyl phosphate and the like; (f) the phenol formaldehyde thermoplastic resins, e.g. Durez 12687, 12707 (TM) and the like; (g) the hydrocarbon resins, e.g. Neville-LX 782, -VX 125 (TM), Para-Flux, Para Resin 2457 (TM); (h) the hydrocarbon resin-coumarone indene polymers, e.g. Picco Resins (TM); (i) the pine tars and pine tar oils, rosin and rosin oils, and tall oil and its derivatives, e.g. PT–101, PT–401, PT–800 (TM); and the like.

EXAMPLES

The following examples will serve to illustrate the invention in more detail:

Silica preparation and examples 1–110

The aqueous slurry of precipitated silica employed in Examples 10–40 was prepared in a manner similar to Example 9 of U.S. Pat. No. 3,250,594 except that the ratio of 41° Bé. commercial sodium silicate $$(Na_2O/(SiO_2)_{3.22})$$

to water was approximately 1 to 4.5 by weight. The carbon dioxide was supplied to the sodium silicate with the aid of a single submerged combustion burner up to the appearance of the Tyndall effect and with two such burners thereafter. The use of the submerged combustion burners was according to U.S. Pat. No. 3,372,046. The silica product was filtered and washed to reduce the soluble salts to the range of 1 to 2% and the filter cake had a solids of approximately 10% by weight. The resulting aqueous silica slurry was designated wet alkaline silica pigment-I, and had a bound alkali content of about 1.5% by weight as $Na_2O$, and a serum pH of about 8.5.

A portion of this alkaline silica slurry was acidified to a pH of 4.5 with dilute sulfuric acid and as a filter cake, with washing to a pH of about 7, had a solids of approximately 10% by weight. The resulting aqueous silica slurry was designated wet silica pigment-II.

The just described filter cakes having a solids content of about 10% by weight are embraced within the term "wet silica pigment" (which herein connotes aqueously wet silica pigment) as are wet pigments of more reduced water content which can be prepared by pressing the said filter cakes, or of augmented water content, e.g. slurries having less than 10% solids content, and the terms "aqueously wet silica pigment" or "aqueously wet state," as employed herein are generic to all such conditions. Thus these terms as employed herein embrace aqueously wet silica pigment materials having a solids content in the range of about 1% to about 65% solids, dry basis, by weight; however, for economy in the practice of the invention wet silica pigments of reduced water content (solids content 8 to 36%) are preferred.

To determine pigment quality a portion of wet silica pigment-II was dried at 105° C., micropulverized and compounded as set forth in Table I hereof.

TABLE I

| Compound ingredients: | Quantities (pts. wt.) |
|---|---|
| Butadiene-styrene copolymer [1] | 100 |
| Silica pigment-II dried | 60 |
| Antioxidant, 2,2 - methylene-bis-(4-methyl-6-t.-butylphenol) | 2.0 |
| Magnesium oxide | 4.0 |
| Paracoumarone-indene resin [2] | 10.0 |
| Zinc oxide | 1.0 |
| N-tert-butyl-2-benzothiazole-sulphenamide | 0.75 |
| N,N'-di-o-tolylguanidine | 1.5 |
| Triethanolamine | 1.0 |
| Phthalic anhydride | 0.75 |
| Sulfur | 2.25 |

[1] SBR 1502.
[2] Cumar Resin RH (a trademark product).

The compound was aged over-night, re-milled and cured for 45 minutes at 287° F.

The physical test data for the vulcanizate so prepared with the foregoing silica pigment is set forth in Table II hereof.

TABLE II

| Silica tested (in vulcanizate) | Hardness (Shore A) | Tensile (p.s.i.) | Modulus (300%) | Elongation (percent) |
|---|---|---|---|---|
| Silica pigment-II | 72 | 3,530 | 1,140 | 575 |

In the examples, in Tables III and IV, Examples 1 through 9, precursor butadiene-styrene copolymers produced by solution polymerization and precursor butyl type rubber are dissolved in solvents and solution grafted with amine type monomers.

In Tables V and VI Examples 10–18 aqueous silica pigment slurries having a bound alkali content are reacted with soluble aluminum and zinc salts and with sulfuric acid and then solution masterbatched with the solution elastomers having amine groups prepared according to Tables III and IV.

In Tables VII and VIII Examples 19–25 the precursor butadiene-styrene copolymer and butyl rubber were solution grafted with amine monomers and quaternized to form the nitrogenous elastomer.

In Tables IX–XIII Examples 26–44 the elastomers with quaternary ammonium groups were combined with aqueous silica slurry treated with water soluble acids (Examples 26–33) with water soluble aluminum and zinc salt reactants (Examples 26–33, 38, and 41–44) and with water soluble alkaline earth metal salt reactants (Examples 36 and 39–40) and without reactant treatment (Example 37).

In Table XIV Examples 45–48 provide soltuions of copolymers containing amine groups and in Table XV Examples 49–52 these active nitrogenous polymers in solution are blended with wet silica pigment which has been treated with aluminum sulfate as the selected reactant and the combination freed of solvent and dried to yield masterbatches.

In Table XVI Examples 53–56 the amine group containing elastomer in solution (Examples 45–48) is quaternized. In Tables XVII and XVIII Examples 57–64 there active nitrogenous polymers are masterbatched with treated silica.

In Table XIX Examples 65 and 66 is described the preparation of solutions of a graft polymer containing amide groups and in Table XX Examples 67–70 masterbatches and preparation are described employing silica treated with reactant.

Table XXI Examples 71–73 provide a recipe and method for preparing a solution of copolymers having amide groups and Table XXII Examples 74–77 provide means of preparing the silica masterbatches with these nitrogenous elastomer solutions.

Table XXV Examples 86–89 provides examples of the preparation of a solvent solution of a copolymer containing amine groups.

In Table XXIII Examples 78–81, Table XXVI Examples 90–93, Table XXVII Examples 94–97 and Tables XXVIII Examples 98–101 exemplify the method and composition employing wet silica pigment and carbon black and/or processing oil and masterbatches from combinations thereof with the nitrogenous elastomer solutions hereof.

In certain of the examples the alkaline silica slurry is mixed with sufficient water soluble aluminum salt, zinc salt, alkaline metal salt and/or acid to react with substantially all of the bound and free alkali and thus reduce the aqueous slurry pH to 7.0 or lower.

It is preferable to employ a silica filter cake, with or without fluidizing by high shear working before or after treatment with reactant. This minimizes the water to be homogenized into the elastomer-solvent cement. Combining of the silica slurry and the cationic nitrogen elastomer-cement is carried out in a typical high speed, high shear mixer. The solvent is readily removed by injecting the homogenized mix into hot or boiling water. To facilitate recovery, solvents are employed which are immiscible with water and which themselves, or as their azeotropes, boil lower than water at atmospheric pressure or at higher or lower pressures if it is desirable to employ such.

The solvents employed in the examples are typical of the $C_4$ to $C_8$ hydrocarbon solvents, e.g. hexane, benzene and toluene, and of the $C_1$ to $C_4$ halocarbon and halohydrocarbon solvents, e.g. methylenechloride, and other members of such groups and mixtures thereof may be selected which are suitable for dissolving the cationic nitrogen elastomers concerned, e.g. butane, pentane, cyclohexane, heptane, octane, xylene, carbon tetrachloride, trichloroethylene, and oxygenated solvents immiscible with water.

The processes of the examples are adaptable for either continuous or batch production of the masterbatch. In those instances in which an oil-rubber-silica pigment masterbatch is desired, up to about 45% of oil based on the elastomer is added to the elastomer-solvent cement, preferably with a small amount of ammonium hydroxide to aid dispersion of the oil and the elastomer cement and it will thus be understood that the masterbatch and elastomer dispersion contemplated by the invention may contain a minor proportion of oil. Similarly in the examples employing the same, any soluble aluminum salt may be substituted for the hydrated aluminum sulfate, e.g. aluminum ammonium sulfate or aluminum sodium sulfate, and the coagulant solution contemplated by the invention may thus comprise minor amounts of ammonium and/or alkali metal salts without detriment to the process. Furthermore the elastomer cement and/or the aqueous dispersion of silica pigment and/or the aqueous reactant solution may contain a small proportion of ammonium hydroxide which appears in certain instances to facilitate practice of the invention. When carbon black is also to be included in the elastomer-silica pigment masterbatch, it may be incorporated as an aqueous slurry along with the slurry of the silica pigment.

In the following tabulations of Examples 1–101 the ingredients (A), (B), (C) etc. are listed in the order of their addition except where otherwise specifically set forth. The masterbatches are conveniently prepared at room temperatures, however, elevated temperatures may be employed as to accelerate the masterbatch formation.

TABLE III

Preparation of Nitrogenous Elastomer by Graft Polymerization in Solution (Parts by wt.)

| | Example | | | | |
|---|---|---|---|---|---|
| | 1 | 2 | 3 | 4 | 5 |
| (A) Polymer solution: | | | | | |
| (a) Precursor polymer: | | | | | |
| Butadiene-styrene [1] | 100 | | | | 100 |
| Butadiene-styrene [2] | | 100 | | | |
| Isobutylene-isoprene [3] | | | 200 | 200 | |
| (b) Solvent: | | | | | |
| Hexane | 900 | 900 | 300 | | 900 |
| Toluene | | | | 300 | |
| (c) Solvation conditions: | | | | | |
| Temperature, °C | 70 | 70 | 70 | 70 | 70 |
| Time agitated, hrs | 12 | 12 | 12 | 12 | 12 |
| (B) Polymer solution grafting: | | | | | |
| (a) Monomers: | | | | | |
| 2-vinyl pyridine | 5 | | 9 | | |
| 4-vinyl pyridine | | 10 | | | |
| t.-Butylaminoethylmethacrylate | | | | | 5 |
| (b) Catalyst: | | | | | |
| Cumene hydroperoxide 80% | 2 | 4 | 3 | 2 | |
| Benzoyl peroxide | | | | | 2 |
| Tetraethylenepentamine | 1 | 2 | 1.5 | 1 | 1 |
| (c) Polymerization conditions: | | | | | |
| Temperature, °C | 70 | 70 | 70 | 70 | 70 |
| Time agitated, hrs | 8 | 8 | 8 | 8 | 8 |

[1] Solprene 300 (a trademark product) a normal viscosity, non-staining, solution polymerized random 75/25 copolymer of butadiene and styrene (milled).
[2] Solprene 1206 (a trademark product) same as (1) except of low viscosity (milled).
[3] Butyl rubber 268 (a trademark product) (milled).

TABLE IV

Preparation of Nitrogenous Elastomer by Graft Polymerization in Solution (Parts by wt.)

| | Example | | | |
|---|---|---|---|---|
| | 6 | 7 | 8 | 9 |
| (A) Polymer solution: | | | | |
| (a) Precursor polymer: | | | | |
| Butadiene-styrene [1] | 100 | | | |
| Isobutylene-isoprene [2] | | 100 | 100 | 100 |
| (b) Solvent: | | | | |
| Hexane | 300 | 300 | | |
| Toluene | | | 300 | 800 |
| (c) Solvation conditions: | | | | |
| Temperature, °C | 70 | 70 | 70 | 70 |
| Time agitated, hrs | 12 | 12 | 12 | 12 |
| (B) Polymer solution grafting: | | | | |
| (a) Monomers: | | | | |
| 2-vinyl pyridine | | | | 5 |
| t.-Butylaminoethylmethacrylate | | | 5 | |
| Diethylaminoethylmethacrylate | 10 | | | |
| Dimethylaminoethylacrylate | | 9 | | |
| (b) Catalyst: | | | | |
| Cumene hydroperoxide 80% | 4 | 3 | | 2 |
| Benzoyl peroxide | | | 2 | |
| Tetraethylenepentamine | 2 | 1.5 | 1 | 1 |
| (c) Polymerization conditions: | | | | |
| Temperature, °C | 70 | 70 | 70 | 70 |
| Time agitated, hrs | 8 | 8 | 8 | 8 |

[1] Solprene 1206 (a trademark product) a low viscosity, non-staining, solution polymerized random 75/25 copolymer of butadiene styrene (milled).
[2] Butyl rubber 268 (milled).

TABLE V

Silica-Nitrogenous Elastomer Masterbatch (Parts by wt.)

| | Example | | | | |
|---|---|---|---|---|---|
| | 10 | 11 | 12 | 13 | 14 |
| (A) Silica pigment slurry-treated: | | | | | |
| (a) Silica pigment slurry: | | | | | |
| Alkaline silica pigment-I (pH=8.5) | 100 | 50 | 50 | 50 | 50 |
| Dry solids basis | 10 | 5 | 5 | 5 | 5 |
| Water | 40 | 20 | 20 | 20 | 20 |
| (b) Reactant-aqueous solution: | | | | | |
| 2% aluminum sulfate [1] | 36 | | | | |
| 2% zinc sulfate | | 15 | | | |
| 2% sulfuric acid | | | 8.5 | 8.5 | |
| Silica slurry pH | 5.0 | 6.5 | 7.0 | 7.0 | 8.5 |
| (c) Treated silica pigment: | | | | | |
| Filtered (X) | X | X [2] | X | X | D |
| Filter cake | 82 | 42 | 44 | 41 | 55 |
| 2% sulfuric (aqueous) | | 0.4 | 1.2 | 1.2 | |
| pH | 5.5 | 5.0 | 5.0 | | |
| (B) Graft polymer solution: | | | | | |
| (a) Polymer solution-Table III (concentration adjusted as indicated): | | | | | |
| Example 1 | 100 | | | | |
| Example 2 | | 50 | | | |
| Example 3 | | | 50 | | |
| Example 4 | | | | 50 | |
| Example 5 | | | | | 100 |
| Polymer content dry | 20 | 10 | 10 | 10 | 10 |

TABLE V—Continued
Silica-Nitrogenous Elastomer Masterbatch (Parts by wt.)

| | Example | | | | |
|---|---|---|---|---|---|
| | 10 | 11 | 12 | 13 | 14 |
| (b) Solvent: | | | | | |
| Hexane | | | | 50 | |
| Benzene | | | | | 25 |
| Antioxidant [3] | 0.4 | 0.4 | 0.2 | 0.2 | 0.2 |
| (C) Combine (A) plus (B) in high shear blender,[4] time mixed, min | 1 | 1 | 1 | 1 | 1 |
| (D) Solvent removal:[5] | | | | | |
| Boiling water | (X) | X | X | X | X |
| Silica separation into water phase | ([6]) | ([6]) | ([6]) | ([6]) | ([6]) |
| (E) Masterbatch: Dried (105° C.) (X) | X | X | X | X | X |

[1] Aluminum sulfate $Al_2(SO_4)_3 \cdot 14H_2O$.
[2] Precipitate rewashed.
[3] The antioxidant is 2,2-methylene-bis(4-methyl-6-t.-butylphenol).
[4] Waring Blender (a trademark product).
[5] The silica-solvated graft polymer is dropped into boiling water to vaporize the solvent and the silica-graft polymer masterbatch is recovered from the aqueous serum and dried.
[6] None.

TABLE VI
Silica-Nitrogenous Elastomer Masterbatch (Parts by Wt.)

| | Example | | | |
|---|---|---|---|---|
| | 15 | 16 | 17 | 18 |
| (A) Silica pigment slurry-treated: | | | | |
| (a) Silica pigment slurry: | | | | |
| Alkaline silica pigment-I (pH 8.5) | 50 | 50 | 50 | 50 |
| Dry solids basis | 5 | 5 | 5 | 5 |
| Water | 20 | 20 | 20 | 20 |
| (b) Reactant-aqueous solution: | | | | |
| 2% aluminum sulfate [1] | 18 | 18 | | |
| 2% sulfuric acid | | | 8.5 | |
| Silica slurry pH | 5.0 | 5.0 | 7.0 | 8.5 |
| (c) Treated silica pigment: Filtered (X) | X | X | X | X |
| (B) Graft polymer solution: | | | | |
| (a) Polymer solution table IV (concentration adjusted as indicated): | | | | |
| Example 6 | 50 | | | |
| Example 7 | | 50 | | |
| Example 8 | | | 50 | |
| Example 9 | | | | 100 |
| Polymer content, dry | 10 | 10 | 10 | 10 |
| (b) Solvent: | | | | |
| n-Pentane | | | 25 | 20 |
| Benzene | 40 | 25 | | |
| Antioxidant [2] | 0.2 | 0.2 | 0.2 | 0.2 |
| Aqueous ammonia 5.6% | 4 | 3 | 5 | |
| (C) Combine (A) plus (B) in high shea blender:[3] | | | | |
| Time mixed, min | 2 | 2 | 2 | 2 |
| (D) Solvent removal:[4] | | | | |
| Boiling water (X) | X | X | X | X |
| Silica separation into water phase | ([5]) | ([5]) | ([5]) | ([5]) |
| (E) Masterbatch: Dried (105° C.) (X) | X | X | X | X |

[1] Aluminum sulfate $Al_2(SO_4)_3 \cdot 14H_2O$.
[2] The antioxidant is 2,2'-methylene-bis(4-methyl-6-t.-butylphenol).
[3] Waring Blender (a trademark product).
[4] The silica-solvated graft polymer masterbatch is dropped into boiling water to vaporize the solvent and the silica-graft polymer masterbatch is recovered from the aqueous serum and dried.
[5] None.

TABLE VII
Preparing Polymers in Solution With Quaternary Ammonium Groups (Parts by wt.)

| | Example | | | |
|---|---|---|---|---|
| | 19 | 20 | 21 | 22 |
| (A) Polymer solution: | | | | |
| (a) Precusor polymer: Butadiene-styrene [1] | 50 | 50 | 50 | 50 |
| (b) Solvent: Hexane | 450 | 450 | 450 | 450 |
| (c) Solvation conditions: | | | | |
| Temperature °C | 70 | 70 | 70 | 70 |
| Time agitated, hrs | 12 | 12 | 12 | 12 |
| (d) Organic peroxide: Cumene hydroperoxide (80%) | 2 | 2 | 2 | |
| (e) Conditions: | | | | |
| Temperature °C | 90 | 90 | 90 | 90 |
| Time agitated, hrs | 4 | 4 | 4 | 4 |
| (B) Polymer grafting and quaternizing: | | | | |
| (a) Monomers: | | | | |
| 2-vinyl pyridine | 3 | 3 | | |
| Dimethylaminoethylmethacrylate | | | 3 | 3 |
| (b) Catalyst-system: | | | | |
| Cumene hydroperoxide (80%) | 1 | 1 | 1 | 1 |
| 10% tetraethylene pentamine in benzene | 4 | 4 | 4 | 4 |
| (c) Polymerization conditions: | | | | |
| Temperature °C | 90 | 90 | 90 | 90 |
| Time agitated, hrs | 14 | 14 | 14 | 14 |
| (d) Quaternizing agent: | | | | |
| Methyl bromide | 5.4 | | 3.6 | |
| Benzyl chloride | | 7.2 | | 4.8 |
| (e) Quaternizing conditions: | | | | |
| Temperature °C | 90 | 90 | 90 | 90 |
| Time agitated, hrs | 4 | 4 | 4 | 4 |

[1] Solprene 300 (a trademark product) a normal viscosity, non-staining, solution polymerized random 75/25 copolymer of butadiene and styrene (milled).

TABLE VIII
Preparing Polymers in Solution With Quaternary Ammonium Groups (Parts by wt.)

| | Example | | |
|---|---|---|---|
| | 23 | 24 | 25 |
| (A) Polymer solution: | | | |
| (a) Precursor polymer: | | | |
| Isobutylene-isoprene [1] | 50 | | |
| Ethylene-propylene terpolymer [2] | | 50 | 50 |
| (b) Solvent: | | | |
| Hexane | 450 | | |
| Benzene | | 650 | 450 |
| (c) Solvation conditions: | | | |
| Temperature °C | 70 | 70 | 70 |
| Time agitated, hrs | 12 | 12 | 12 |
| (d) Organic peroxide: Cumene hydroperoxide (80%) | 2 | 2 | 2 |
| (e) Conditions: | | | |
| Temperature °C | 90 | 90 | 90 |
| Time agitated, hrs | 4 | 4 | 09 |
| (B) Polymer grafting and quaternizing: | | | |
| (a) Monomers: | | | |
| 2-vinyl pyridine | 3 | | |
| Dimethylaminoethylmethacrylate | | 3 | 3 |
| (b) Catalyst system: | | | |
| Cumene hydroperoxide (80%) | 1 | 1 | 1 |
| 10% tetraethylenepentamine in benzene | 4 | 4 | 4 |
| (c) Polymerization conditions: | | | |
| Temperature °C | 90 | 90 | 90 |
| Time agitated, hrs | 14 | 14 | 14 |
| (d) Quaternizing agent: | | | |
| Methyl bromide | 5.4 | 3.6 | |
| Benzyl chloride | | | 4.8 |
| (e) Quaternizing conditions: | | | |
| Temperature °C | 90 | 90 | 9 |
| Time agitated | 4 | 4 | 0 4 |

[1] Butyl rubber 268 (a trademark product) (milled).
[2] Nordel 1320, (a trademark product), a terpolymer of ethylene, propylene and a non-conjugated diene (milled).

TABLE IX
Masterbatch Silica-Elastomer Grafted With Quaternary Ammonium Groups (Parts by wt.)

| | Example | | | |
|---|---|---|---|---|
| | 26 | 27 | 28 | 29 |
| (A) Silica pigment slurry treated: | | | | |
| (a) Silica pigment slurry: | | | | |
| Alkaline silica pigment-I (pH 9.4) | 200 | 200 | 200 | 200 |
| Dry solids basis | 20 | 20 | 20 | 20 |
| Water | 50 | 50 | 50 | 50 |
| (b) Reactant-aqueous solution: | | | | |
| 10% sulfuric acid | 6.8 | 6.8 | 6.8 | 6.8 |
| Silica slurry, pH | 7 | 7 | 7 | 7 |
| (c) Treated silica pigment: | | | | |
| Filtered (X) | X | X | X | X |
| Filter cake | 162 | 162 | 162 | 162 |
| (B) Solution polymer with quaternary ammonium groups—Table VII: | | | | |
| Example 19 | 400 | | | |
| Example 20 | | 400 | | |
| Example 21 | | | 400 | |
| Example 22 | | | | 400 |
| Polymer content | 40 | 40 | 40 | 40 |
| Antioxidant [1] | 0.8 | 0.8 | 0.8 | 0.8 |
| (C) Blending (A) plus (B): Blender, min.[2] | 0.5 | 0.5 | 0.5 | 0. |
| (D) Solvent removal: [3] | | | | |
| Boiling water (X) | X | X | X | X |
| Silica separation into water | ([4]) | ([4]) | ([4]) | ([4]) |
| (E) Masterbatch: Dried (105° C.) (X) | X | X | X | X |

[1] The antioxidant is 2,2'-methyl-bis(4-methylene-6-t.-butylphenol).
[2] Waring blender (a trademark product).
[3] The silica-graft polymer masterbatch is dropped into boiling water to vaporaize the solvent and the polymer-silica masterbatch is recoverde from the aqueous serum and dried.
[4] None.

TABLE X
Masterbatch Silica-Elastomer Grafted With Quaternary Ammonium Groups (Parts by wt.)

| | Example | | | |
|---|---|---|---|---|
| | 30 | 31 | 32 | 33 |
| (A) Silica pigment slurry treated: | | | | |
| (a) Silica pigment slurry: | | | | |
| Alkaline silica pigment-I (pH 9.4) | 200 | 200 | 200 | 200 |
| Dry solids basis | 20 | 20 | 20 | 20 |
| Water | 50 | 50 | 50 | 50 |
| (b) Reactant-aqueous solution: | | | | |
| 10% sulfuric acid | 6.8 | 6.8 | 6.8 | 6.8 |
| Silica slurry, pH | 7 | 7 | 7 | 7 |
| (c) Treated silica pigment: | | | | |
| Filtered (X) | X | X | X | X |
| Filter cake | 162 | 162 | 162 | 162 |
| (B) Solution polymer with quaternary ammonium groups—Table VIII: | | | | |
| Example 23 | 400 | | | |
| Example 24 | | 560 | | |
| Example 25 | | | 400 | 400 |
| Polymer content | 40 | 40 | 40 | 40 |
| Antioxidant [1] | 0.8 | 0.8 | 0.8 | 0.8 |

TABLE X—Continued

| | Example | | | |
|---|---|---|---|---|
| | 30 | 31 | 32 | 33 |
| (C) Blending (A) plus (B): | | | | |
| Blender, min.[3] | 0.5 | 0.5 | 0.5 | 0.5 |
| 28% aqueous ammonia | 1.0 | | | |
| 10% sulfuric acid | | | 1.0 | |
| (D) Solvent removal:[3] | | | | |
| Boiling water (X) | X | X | X | X |
| Silica separation into water | (4) | (4) | (4) | (4) |
| (E) Masterbatch: Dried (105° C.) (X) | X | X | X | X |

[1] The antioxidant is 2,2'-methylene-bis(4-methyl-6-t.-butylphenol).
[2] Waring blender (a trademark product).
[3] The silica-graft polymer masterbatch is dropped into boiling water to vaporize the solvent and the polymer-silica masterbatch is recovered from the aqueous serum and dried.
[4] None.

TABLE XI
Masterbatch Silica-Elastomer Grafted With Quaternary Ammonium Groups (Parts by wt.)

| | Example | | | |
|---|---|---|---|---|
| | 34 | 35 | 36 | 37 |
| (A) Silica pigment slurry treatment: | | | | |
| (a) Silica pigment slurry: | | | | |
| Alkaline silica pigment-I (pH 9.4) | 200 | 200 | 200 | 200 |
| Dry solids basis | 20 | 20 | 20 | 20 |
| Water | 50 | 50 | 50 | 50 |
| (b) Reactant-aqueous solution: | | | | |
| 2% aluminum sulfate [1] | 72 | | | |
| 2% zinc sulfate | | 60 | | |
| 2% magnesium sulfate | | | 36 | |
| (c) Treated silica pigment: | | | | |
| Filtered (X) | X | X | X | X |
| Filter cake | 164 | 170 | 160 | 206 |
| (B) Solution polymer with quaternary ammonium groups—Table VII: | | | | |
| Example 19 | 400 | | | |
| Example 20 | | 400 | | |
| Example 21 | | | 400 | |
| Example 22 | | | | 400 |
| Polymer content | 40 | 40 | 40 | 40 |
| Antioxidant [2] | 0.8 | 0.8 | 0.8 | 0.8 |
| (C) Blending (A) plus (B): Blender, min.[3] | 0.5 | 0.5 | 0.5 | 0.5 |
| (D) Solvent removal:[4] | | | | |
| Boiling water (X) | X | X | X | X |
| Silica separation into water | (5) | (5) | (5) | (5) |
| (E) Masterbatch: Dried (105° C.) (X) | X | X | X | X |

[1] Aluminum sulfate Al$_2$(SO$_4$)$_3$·14H$_2$O.
[2] Antioxidant 2,2'-methylene-bis(4-methyl-6-t.-butylphenol).
[3] Waring blender (a trademark product).
[4] The silica-graft polymer masterbatch is dropped into boiling water to vaporize the solvent and the polymer-silica masterbatch is recovered from the aqueous serum and dried.
[5] None.

TABLE XII
Masterbatch Silica-Elastomer Grafted With Quaternary Ammonium Groups (Parts by wt.)

| | Example | | | |
|---|---|---|---|---|
| | 38 | 39 | 40 | 41 |
| (A) Silica pigment slurry: | | | | |
| (a) Silica pigment slurry: | | | | |
| Alkaline silica pigment-I (pH 9.4) | 200 | 200 | 200 | 200 |
| Dry solids basis | 20 | 20 | 20 | 20 |
| Water | 50 | 50 | 50 | 50 |
| (b) Reactant-aqueous solution: | | | | |
| 2% Aluminum sulfate [1] | 36 | | | |
| 2% calcium chloride | | 47 | | |
| 2% barium chloride | | | 80 | |
| 2% Ammonium alum | | | | 113 |
| 2% sulfuric acid | 17 | | | |
| (c) Treated silica pigment: | | | | |
| Filtered (X) | X | X | X | X |
| Filter cake | 164 | 162 | 160 | 160 |
| (B) Solution polymer with quaternary ammonium groups—Table VII: | | | | |
| Example 19 | 400 | | | |
| Example 20 | | 400 | | |
| Example 24 | | | 400 | |
| Example 25 | | | | 400 |
| Polymer content | 40 | 40 | 40 | 40 |
| Antioxidant [2] | | | | |
| (C) Blending (A) plus (B): Blender, min.[3] (X) | X | X | X | X |
| (D) Solvent removal:[4] | | | | |
| Boiling water (X) | X | X | X | X |
| Silica separation into water | (5) | (5) | (5) | (5) |
| (E) Masterbatch: Dried (105° C.) (X) | X | X | X | X |

[1] Aluminum sulfate Al$_2$(SO$_4$)$_3$·14H$_2$O.
[2] Antioxidant 2,2'-methylene-bis(4-methyl-6-t.-butylphenol).
[3] Waring blender (a trademark product).
[4] The silica-graft polymer masterbatch is dropped into boiling water to vaporize the solvent and the polymer-silica masterbatch is recovered from the aqueous serum and dried.
[5] None.

TABLE XIII
Silica-Elastomer Masterbatch (Parts by wt.)

| | Example | | |
|---|---|---|---|
| | 42 | 43 | 44 |
| (A) Silica pigment slurry: | | | |
| (a) Silica pigment slurry: | | | |
| Alkaline silica pigment-I (pH 8.5-9.5) | 200 | 200 | 200 |
| Dry solids basis | 20 | 20 | 20 |
| Water | 100 | 100 | 100 |
| (b) Reactant-aqueous solution: 2% aluminum sulfate [1] | 72 | 72 | 72 |
| (c) Treated silica pigment: | | | |
| Filtered (X) | X | X | X |
| Filter cake | 165 | 165 | 165 |
| (B) Solution polymer with quaternary ammonium groups—table VII: | | | |
| Example 19 | 400 | | |
| Example 20 | | 400 | |
| Example 21 | | | 400 |
| Polymer content dry solids | 40 | 40 | 40 |
| Benzene | | 100 | 150 |
| (C) Blending (A) plus (B): Blender, min.[2] (X) | X | X | X |
| (D) Solvent removal:[3] | | | |
| Boiling water (X) | X | X | X |
| Silica separation into water | (4) | (4) | (4) |
| (E) Masterbatch: Dried (105° C.) (X) | X | X | X |

[1] Aluminum sulfate Al$_2$(SO$_4$)$_3$·14H$_2$O.
[2] Waring blender (a trademark product).
[3] The silica-graft polymer masterbatch is dropped into boiling water to vaporize the solvent and the polymer-silica masterbatch is recovered from the aqueous serum and dried.
[4] None.

TABLE XIV
Preparation of Polymers with Amine Groups (Parts by wt.)

| | Example | | | |
|---|---|---|---|---|
| | 45 | 46 | 47 | 48 |
| (A) Polymer latex: | | | | |
| (a) Recipe: | | | | |
| Tallow soap | 5 | 5 | 5 | 5 |
| Water | 180 | 180 | 180 | 180 |
| Styrene | 20 | 23 | 23 | 20 |
| 2-vinylpyridine | 5 | 2 | | |
| Dimethylaminoethylmethacrylate | | | 2 | |
| t.-Butylaminoethylmethacrylate | | | | 5 |
| Butadiene-1,3 | 80 | 80 | 80 | 80 |
| Potassium persulfate | 1 | 1 | 1 | 1 |
| Mercaptan MTM [1] | 0.5 | 0.5 | 0.5 | 0.5 |
| (b) Conditions: | | | | |
| Temperature, °C | 50 | 50 | 50 | 50 |
| Hours | 7 | 7 | 6 | 6 |
| (B) Coagulation: | | | | |
| (a) Poured into: | | | | |
| Isopropanol | 900 | 900 | 900 | 900 |
| Antioxidant [2] | 22.5 | 22.5 | 22.5 | 22.5 |
| (b) Coagulum: | | | | |
| Filtered (X) | X | X | X | X |
| Yield, wet cake | 153 | 93 | 144 | 145 |
| Dried (105° C.) (X) | X | X | X | X |
| Yield, dry | 59.5 | 45.5 | 75.6 | 71.0 |
| (C) Solvation: | | | | |
| Benzene | 535 | 439 | 680 | 639 |
| Hours/°C | 12/50 | 12/50 | 12/50 | 12/50 |

[1] A tertiary mercaptan (a trademark product).
[2] The antioxidant is 2,2'-methylene-bis(4-methyl-6-t.-butylphenol).

TABLE XV
Silica-Polymer Masterbatch (Parts by wt.)

| | Example | | | |
|---|---|---|---|---|
| | 49 | 50 | 51 | 52 |
| (A) Silica pigment slurry: | | | | |
| Alkaline silica pigment-I (pH=8.5-9.5) | 25 | 25 | 25 | 25 |
| Dry solids basis | 2.5 | 2.5 | 2.5 | 2.5 |
| Water | 40 | 40 | 40 | 40 |
| (B) Reactant-aqueous solution: 2% aluminum sulfate [1] | 8.5 | 8.5 | 8.5 | 8.5 |
| (C) Combine (C) and (D): | | | | |
| Blend (X) | X | X | X | X |
| Filter (X) | X | X | X | X |
| (D) Polymer solution—Table XIV: | | | | |
| Example 45 | 50 | | | |
| Example 46 | | [2]50 | | |
| Example 47 | | | 50 | |
| Example 48 | | | | 50 |
| Dry solids | 5 | 5 | 5 | 5 |
| Antioxidant [3] | 0.1 | 0.1 | 0.1 | 0.1 |
| (E) Combine (C) and (D): Blend,[4] min | 0.5 | 0.5 | 0.5 | 0.5 |
| (F) Solvent removal:[5] | | | | |
| Boiling water (X) | X | X | X | X |
| Silica separation in serum | (6) | (6) | (6) | (6) |
| (G) Masterbatch: Dried (105° C.) (X) | X | X | X | X |

[1] Aluminum sulfate Al$_2$(SO$_4$)$_3$·14H$_2$O.
[2] Concentration adjusted as indicated.
[3] Antioxidant is 2,2'-methylene-bis(4-methyl-6-t.-butylphenol).
[4] Waring Blender (a trademark product).
[5] The silica-solvated polymer masterbatch is dropped into boiling water to vaporize the solvent and the silica polymer masterbatch is recovered and dried.
[6] None.

TABLE XVI
Preparation of Polymers With Quaternary Ammonium Groups (Parts by wt.)

| | Examples | | | |
|---|---|---|---|---|
| | 53 | 54 | 55 | 56 |
| (A) Polymer solution: | | | | |
| Example 45 | 50 | | | |
| Example 46 | | 50 | | |
| Example 47 | | | 50 | |
| Example 48 | | | | 50 |
| Dry solids | 5 | 5 | 5 | 5 |
| (B) Quaternization: | | | | |
| (a) Quaternizing agent: Methyl bromide | 0.2 | 0.2 | 0.2 | 0.2 |
| (b) Quaternizing condition: | | | | |
| Temperature, °C | 70 | 70 | 70 | 70 |
| Time, hrs | 6 | 6 | 6 | 6 |

TABLE XVII
Silica-Polymer Masterbatch (Parts by wt.)

| | Example | | | |
|---|---|---|---|---|
| | 57 | 58 | 59 | 60 |
| (A) Silica pigment slurry: | | | | |
| Alkaline silica slurry-I (pH=8.5-9.5) | 25 | 25 | 25 | 25 |
| Dry solids basis | 2.5 | 2.5 | 2.5 | 2.5 |
| Water | 40 | 40 | 40 | 40 |
| (B) Reactant-aqueous solution: 2% aluminum sulfate[1] | 9.0 | 9.0 | 9.0 | 9.0 |
| (C) Combine (A) and (B): | | | | |
| Blend (X) | X | X | X | X |
| Filter (X) | X | X | X | X |
| (D) Polymer solution—Table XVI: | | | | |
| Example 53 | 50 | | | |
| Example 54 | | 50 | | |
| Example 55 | | | 50 | |
| Example 56 | | | | 50 |
| Antioxidant[2] | 0.1 | 0.1 | 0.1 | 0.1 |
| 10% sulfuric acid | | 1 | | |
| Dry solids | 5 | 5 | 5 | 5 |
| (E) Combine (C) and (D): Blend,[3] min | 0.5 | 0.5 | 0.5 | 0.5 |
| (F) Solvent removal:[4] | | | | |
| Boiling water (X) | X | X | X | X |
| Silica separation in water | ([5]) | ([5]) | ([5]) | ([5]) |
| (G) Masterbatch: Dried (105° C.) (X) | X | X | X | X |

[1] Aluminum sulfate $Al_2(SO_4)_3 \cdot 14H_2O$.
[2] Antioxidant 2,2'-methylene-bis(4-methyl-6-t.-butylphenol).
[3] Waring Blender (a trademark product).
[4] The silica-solvated polymer masterbatch is dropped into boiling water to vaporize the solvent and the silica polymer masterbatch is recovered and dried.
[5] None.

TABLE XVIII
Silica-Polymer Solution Masterbatch (Parts by wt.)

| | Example | | | |
|---|---|---|---|---|
| | 61 | 62 | 63 | 64 |
| (A) Silica pigment slurry: | | | | |
| Alkaline silica slurry-I (phH=8.5-9.5) | 25 | 25 | 25 | 25 |
| Dry solids basis | 2.5 | 2.5 | 2.5 | 2.5 |
| Water | 40 | 40 | 40 | 40 |
| (B) Reactant-aqueous solution: | | | | |
| 2% magnesium sulfate | 5.5 | | | |
| 2% zinc sulfate | | 7.0 | | |
| 2% barium chloride | | | 9.0 | |
| 2% calcium chloride | | | | 5.0 |
| (C) Combine (A) and (B): | | | | |
| Blend, (X) | X | X | X | X |
| Filter, (X) | X | X | X | X |
| (D) Polymer solution—Table XVI: | | | | |
| Example 53 | 50 | | | |
| Example 54 | | 50 | | |
| Example 55 | | | 50 | |
| Example 56 | | | | 50 |
| Antioxidant[1] | 0.1 | 0.1 | 0.1 | 0.1 |
| 28% aqueous ammonia | | 1 | 1 | |
| Dry solids | 5 | 5 | 5 | 5 |
| (E) Combination (C) and (D) Blend,[2] min | 0.5 | 0.5 | 0.5 | 0.5 |
| (G) Solvent removal:[3] | | | | |
| Boiling water (X) | X | X | X | X |
| Silica separation in serum | ([4]) | ([4]) | ([4]) | ([4]) |
| (E) Masterbatch: Dried (105° C.) (X) | X | X | X | X |

[1] The antioxidant is 2,2'-methylene-bis(4-methyl-6-t.-butylphenol).
[2] Waring Blender (a trademark product).
[3] The silica-solvated polymer masterbatch is dropped into boiling water to vaporize the solvent and the silica-polymer masterbatch is recovered and dried.
[4] None.

TABLE XIX
Preparation of Solution of Graft Polymer Containing Amide Groups (Parts by wt.)

| | Example | |
|---|---|---|
| | 65 | 66 |
| (A) Graft elastomer latex: | | |
| Butadiene-styrene copolymer[1] | 520 | 520 |
| Dry solids basis | 100 | 100 |
| Water | 100 | 100 |
| Methacrylamide | 5 | |
| Acrylamide | | 3 |
| Cumene hydroperoxide | 1 | 1 |
| 10% aqueous TEPA[2] | 4 | 4 |
| Polymerization: | | |
| Temperature, °C | 50 | 50 |
| Time, hrs | 4 | 4 |
| Dry solids, percent | 14.5 | 14.3 |
| (B) Coagulation: | | |
| (a) Poured into: | | |
| Isopropanol | 900 | 900 |
| Antioxidant[3] | 20 | 20 |
| (b) Coagulum: | | |
| Filtered (X) | X | X |
| Filter cake dried (105° C.) | | |
| Yield dry | 106 | 104 |
| (C) Solvation: | | |
| Benzene | 954 | 936 |
| Agitated hrs./°C | 12/50 | 12/50 |

[1] SBR-1502 latex (TS=19.3%).
[2] Tetraethylenepentamine.
[3] The antioxidant is 2,2'-methylene-bis(4-methyl-6-t.-butylphenol).

TABLE XX
Silica-Polymer Masterbatch (Parts by wt.)

| | Example | | | |
|---|---|---|---|---|
| | 67 | 68 | 69 | 70 |
| (A) Silica pigment slurry: | | | | |
| Alkaline silica pigment-I (pH=8.5-9.5) | 25 | 25 | 25 | 25 |
| Dry solids basis | 2.5 | 2.5 | 2.5 | 2.5 |
| Water | 40 | 40 | 40 | |
| (B) Reagent-aqueous solution: | | | | |
| 2% aluminum sulfate[1] | 9 | | | |
| 2% calcium chloride | | 5 | 4.5 | |
| 2% sulfuric acid | | | | |
| (C) Combine (A) and (B): | | | | |
| Blend, (X) | X | X | X | |
| Filter, (X) | X | X | X | |
| (D) Polymer solution—Table XIX: | | | | |
| Example 65 | 50 | 50 | | |
| Example 66 | | | 50 | 50 |
| Dry solids basis | 5 | 5 | 5 | 5 |
| 2% sulfuric acid | | | 2 | |
| (E) Combine (C) and (D): Blend,[2] min | 1 | 1 | 1 | 1 |
| (F) Solvent removal: | | | | |
| Boiling water (X) | X | X | X | X |
| Silica separation in serum | ([3]) | ([3]) | ([3]) | ([3]) |
| (G) Masterbatch: Dried (105° C.) (X) | X | X | X | X |

[1] Aluminum sulfate $Al_2(SO_4)_3 \cdot 14H_2O$.
[2] Waring Blender, a trademark product.
[3] None.

TABLE XXI
Preparation of Solutions of Polymers Containing Amide Groups (Parts by wt.)

| | Example | | |
|---|---|---|---|
| | 71 | 72 | 73 |
| (A) Elastomer latex: | | | |
| (a) Recipe: | | | |
| Water | 360 | 360 | 360 |
| Tallow fatty acid sodium salt | 10 | 10 | 10 |
| Styrene | 40 | 40 | 40 |
| Acrylamide | 10 | | |
| N-t.-butylacrylamide | | 10 | |
| Methacrylamide | | | 10 |
| Butadiene-1,3 | 160 | 160 | 160 |
| Potassium persulfate | 2 | 2 | 2 |
| Mercaptan MTM[1] | | | |
| (b) Polymerization conditions: | | | |
| Temperature, °C | 50 | 50 | 50 |
| Hours | 1¾ | (¾) | 1¾ |
| (B) Coagulation: | | | |
| (a) Pour into: | | | |
| Isopropanol | 1,800 | 1,800 | 1,900 |
| Antioxidant[2] | 20 | 20 | 20 |
| (b) Coagulum: | | | |
| Filtered (X) | X | X | X |
| Filter cake dried (105° C.) | X | X | X |
| Yield | 62.9 | 71.4 | 123 |
| (C) Solvation: | | | |
| Benzene | 566 | 643 | 1,107 |
| Agitated hrs./°C | 12-50 | 12-50 | 12-50 |

[1] A trademark product of mixed $C_{12}$, $C_{14}$ and $C_{16}$ tertiary mercaptans.
[2] Antioxidant is 2,2'-methylene-bis(4-methyl-6-t.-butylphenol).

TABLE XXII

Silica-Polymer Solution Masterbatch (Parts by wt.)

| | Example | | | |
|---|---|---|---|---|
| | 74 | 75 | 76 | 77 |
| (A) Silica pigment slurry: | | | | |
| Alkaline silica pigment-I (pH=8.5-9.5) | 25 | 25 | 25 | 25 |
| Dry solids basis | 2.5 | 2.5 | 2.5 | 2.5 |
| Water | 40 | 40 | 40 | 40 |
| (B) Reagent-aqueous solution: | | | | |
| 2% aluminum sulfate [1] | 9 | | | |
| 2% zinc sulfate | | 7 | | |
| 2% calcium chloride | | | 5 | |
| 2% sulfuric acid | | | | 4.5 |
| (C) Blend (A) and (B): | | | | |
| Blend, (X) | X | X | X | X |
| Filter, (X) | X | X | X | X |
| (D) Polymer solution—Table XXI: | | | | |
| Example 71 | 50 | 50 | | |
| Example 72 | | | 50 | |
| Example 73 | | | | 50 |
| Dry solids basis | 5 | 5 | 5 | 5 |
| Antioxidant [2] | 0.1 | 0.1 | 0.1 | 0.1 |
| (E) Blend (C) and (D): Blender [3], min | 1 | 1 | 1 | 1 |
| (F) Solvent removal: [4] | | | | |
| Boiling water (X) | X | X | X | X |
| Silica separation in serum | ([5]) | ([5]) | ([5]) | ([5]) |
| (G) Masterbatch: Dried (105° C.) (X) | X | X | X | X |

[1] Aluminum sulfate Al$_2$(SO$_4$)$_3$·14H$_2$O.
[2] Antioxidant is 2,2'-methylene-bis(4-methyl-6-t.-butylphenol).
[3] Waring Blender (a trademark product).
[4] The silica-solvated polymer masterbatch is injected into boiling water to vaporize the solvent and the silica-polymer masterbatch is recovered and dried.
[5] None.

TABLE XXIII

Silica-Polymer Masterbatch (Parts by wt.)

| | Example | | | |
|---|---|---|---|---|
| | 78 | 79 | 80 | 81 |
| (A) Silica pigment slurry: | | | | |
| Alkaline silica pigment-I (pH=8.5-9.5) | 25 | 25 | 25 | 25 |
| Dry solids basis | 2.5 | 2.5 | 2.5 | 2.5 |
| Water | 40 | 40 | 40 | 40 |
| (B) Reagent-aqueous solution: 2% aluminum sulfate [1] | 8.5 | 8.5 | 8.5 | 8.5 |
| (C) Combine (A) and (B): | | | | |
| Blend, (X) | X | X | X | X |
| Filter, (X) | X | X | X | X |
| (D) Carbon black: | | | | |
| Philblack O [2] | 5 | | | 5 |
| Thermax [2] | | 5 | | |
| Statex 160HR [2] | | | 5 | |
| (E) Processing oil: Circosol 2XH [3] | | | 0.6 | 0.6 |
| (F) Combine (A) with (D) and (E): Blender, min | 1 | 1 | 1 | 1 |
| (G) Solution of polymer—Table XXI: | | | | |
| Example 71 | 150 | | | 150 |
| Example 72 | | 150 | | |
| Example 73 | | | 150 | |
| 4.6% aqueous ammonium dry solids | 15 | 15 | 15 | 15 |
| (H) Blend (F) and (D): Blender, [4] min | 1 | 1 | 1 | 1 |
| (I) Solvent removal: [5] | | | | |
| Boiling water (X) | X | X | X | X |
| Silica and/or black separation into serum | ([6]) | ([6]) | ([6]) | ([6]) |
| (J) Masterbatch: Dried (105° C.) (X) | X | X | X | X |

[1] Aluminum sulfate Al$_2$(SO$_4$)$_3$·14H$_2$O.
[2] Carbon black (trademark product).
[3] Processing oil (trademark product).
[4] Waring Blender (a trademark product).
[5] The silica-solvated polymer masterbatch is injected into boiling water to vaporize the solvent and the silica-polymer masterbatch is recovered and dried.
[6] None.

TABLE XXIV

Silica-Polymer Masterbatch (Parts by wt.)

| | Example | | | |
|---|---|---|---|---|
| | 82 | 83 | 84 | 85 |
| (A) Silica pigment slurry: | | | | |
| Alkaline silica pigment-I (pH=8.5-9.5) | 25 | 25 | 25 | 75 |
| Dry solids basis | 2.5 | 2.5 | 2.5 | 7.5 |
| Water | 40 | 40 | 40 | 100 |
| (B) Reagent-aqueous solution: | | | | |
| 2% aluminum sulfate [1] | | | 9.0 | 18.0 |
| 2% calcium chloride | | 8.5 | | |
| (C) Combine (A) and (B): | | | | |
| Blend, (X) | | X | X | X |
| Filter, (X) | | X | X | X |
| (D) Carbon black: | | | | |
| Statex 160HR [2] | 5 | | | |
| Philblack O [2] | | 5 | | |
| Thermax [2] | | | 5 | |
| (E) Processing oil: Circosol 2XH [3] | 0.5 | | | 2.5 |

TABLE XXIV—Continued

| | Example | | | |
|---|---|---|---|---|
| | 82 | 83 | 84 | 85 |
| (F) Polymer solution—Table XIX: | | | | |
| Example 65 | 150 | | | |
| Example 66 | 15 | 150 | 150 | 200 |
| Dry solids basis | 15 | 15 | 15 | 20 |
| (G) Blend (C), (D) and (E): Blender [4], min | 1 | 1 | 1 | 1 |
| (H) Solvent removal: | | | | |
| Boiling water (X) | X | X | X | X |
| Silica separation | ([5]) | ([5]) | ([5]) | ([5]) |
| (I) Masterbatch: Dried (105° C.) (X) | X | X | X | X |

[1] Aluminum sulfate Al$_2$(SO$_4$)$_3$·14H$_2$O.
[2] Carbon black (a trademark product).
[3] Processing oil (a trademark product).
[4] Waring Blender (a trademark product).
[5] None.

TABLE XXV

Preparing Solutions of Copolymers With Nitrogenous Groups (Parts by wt.)

| | Example | | | |
|---|---|---|---|---|
| | 86 | 87 | 88 | 89 |
| (A) Polymer latex: | | | | |
| (a) Recipe: | | | | |
| Tallow sodium soap | 5 | 5 | 5 | 5 |
| Water | 180 | 180 | 180 | 180 |
| Styrene | 20 | 23 | 23 | 20 |
| 2-vinylpyridene | 5 | 2 | | |
| Dimethylaminoethylmethacrylate | | | 2 | |
| t.-Butylaminoethylmethacrylate | | | | 5 |
| Butadiene-1,3 | 80 | 80 | 80 | 80 |
| Potassium persulfate | 1 | 1 | 1 | 1 |
| Mercaptan MTM [1] | 0.5 | 0.5 | 0.5 | 0.5 |
| (b) Polymerization conditions: | | | | |
| Temperature, °C | 50 | 50 | 50 | 50 |
| Hours | 7 | 7 | 6 | 6 |
| (B) Coagulation: | | | | |
| (a) Poured into: | | | | |
| Isopropanol | 900 | 900 | 900 | 900 |
| Antioxidant [2] | 22.5 | 22.5 | 22.5 | 22.5 |
| (b) Coagulum: | | | | |
| Filtered (X) | X | X | X | X |
| Yield, wet cake | 154 | 93 | 144 | 145 |
| Dried (105° C.) (X) | X | X | X | X |
| Yield, dry | 59.5 | 45.5 | 75.6 | 71.0 |
| (C) Solvation: | | | | |
| Benzene | 535 | 414 | 680 | 639 |
| Hours/°C | 12/50 | 12/50 | 12/50 | 12/50 |

[1] A tertiary mercaptan (a trademark product).
[2] The antioxidant is 2,2'-methylene-bis(4-methyl-6-t.-butylphenol).

TABLE XXVI

Silica-Solution Polymer Masterbatch Including Carbon Black and Processing Oil (Parts by wt.)

| | Example | | | |
|---|---|---|---|---|
| | 90 | 91 | 92 | 93 |
| (A) Silica pigment slurry: | | | | |
| Alkaline silica pigment-I (pH=8.5-9.5) | 25 | 25 | 25 | 25 |
| Dry solids basis | 2.5 | 2.5 | 2.5 | 2.5 |
| Water | 40 | 40 | 40 | 40 |
| (B) Reactant-aqueous solution: | | | | |
| 2% aluminum sulfate [1] | 8.5 | | | |
| 2% sulfuric acid | | 4.5 | | |
| 2% calcium chloride | | | 5.0 | |
| (C) Combine (A) and (B): | | | | |
| Blend, (X) | X | X | X | X |
| Filter, (X) | X | X | X | X |
| (D) Carbon black and processing oil: | | | | |
| Philblack O [2] | 5 | 5 | | |
| Statex 160HR [2] | | | 5 | 5 |
| (E) Processing oil: Sundex 2XH [3] | 0.5 | | | |
| (F) Polymer solutions—Table XXIV: | | | | |
| Example 86 | 150 | | | |
| Example 87 | | 150 | | |
| Example 88 | | | 150 | |
| Example 89 | | | | 150 |
| Dry solids basis | 15 | 15 | 15 | 15 |
| (G) Combine (D), (E) and (F): Blend, [4] min | 0.5 | 0.5 | 0.5 | 0.5 |
| (H) Solvent removal: [5] | | | | |
| Boiling water (X) | X | X | X | X |
| Silica and black separation in serum | ([6]) | ([6]) | ([6]) | ([6]) |
| (I) Masterbatch: Dried (105° C.) (X) | X | X | X | X |

[1] Aluminum sulfate Al$_2$(SO$_4$)$_3$·14H$_2$O.
[2] Carbon black (a trademark product).
[3] Processing oil (a trademark product).
[4] Waring Blender (a trademark product).
[5] The silica-solvated polymer masterbatch is dropped into boiling water to vaporize the solvent and the silica-polymer masterbatch is recovered and dried.
[6] None.

TABLE XXVII

Silica-Polymer Solution Masterbatch Including Carbon Black and Processing Oil (parts by wt.)

| | Example | | | |
|---|---|---|---|---|
| | 94 | 95 | 96 | 97 |
| (A) Silica pigment slurry: | | | | |
| Alkaline silica pigment-I (pH=8.5-9.5) | 25 | 25 | 25 | 25 |
| Dry solids basis | 2.5 | 2.5 | 2.5 | 2.5 |
| Water | 30 | 30 | 30 | 30 |
| (B) Reactant-aqueous solution: | | | | |
| 2% aluminum sulfate [1] | 8.5 | | | |
| 2% sulfuric acid | | | 4.5 | |
| 2% calcium chloride | | | | 2.0 |
| (B) Combine (A) and (B): | | | | |
| Blend, (X) | X | X | X | X |
| Filter, (X) | X | X | X | X |
| (D) Carbon black: | | | | |
| Philblack O [2] | 5 | 5 | | |
| Statex 160HR [2] | | | 5 | 5 |
| (E) Processing oil: | | | | |
| Sundex 2XH [3] | 0.5 | | | |
| (F) Polymer solution—Table XVI (D)–Table XVI: | | | | |
| Example 53 | 150 | | | |
| Example 54 | | 150 | | |
| Example 55 | | | 150 | |
| Example 56 | | | | 150 |
| Dry solids | 15 | 15 | 15 | 15 |
| Antioxidant [4] | 0.3 | 0.3 | 0.3 | 0.3 |
| (G) Blend (C), (D), (E) and (F): | | | | |
| Blend [5], min | 0.5 | 0.5 | 0.5 | 0.5 |
| (H) Solvent removal:[6] | | | | |
| Boiling water (X) | X | X | X | D |
| Silica and black separation in serum | ([7]) | ([7]) | ([7]) | ([7]) |
| (I) Masterbatch: Dried (105° C.) (X) | X | X | X | X |

[1] Aluminum sulfate $Al_2(SO_4)_3 \cdot 14H_2O$.
[2] Carbon black (a trademark product).
[3] Processing oil (a trademark product).
[4] Antioxidant is 2,2'-methylene-bis(4-methyl-6-t.-butylphenol).
[5] Waring Blender (a trademark product).
[6] The silica-solvated polymer masterbatch is dropped into boiling water to vaporize the solvent and the silica-polymer masterbatch is recovered and dried.
[7] None.

TABLE XXVIII

Silica-Elastomer Masterbatch Including Processing Oil and/or Carbon Black (Parts by wt.)

| | Example | | | |
|---|---|---|---|---|
| | 98 | 99 | 100 | 101 |
| (A) Silica pigment slurry-treated with carbon black and/or processing oil: | | | | |
| (a) Silica pigment slurry: | | | | |
| Alkaline silica pigment-I (pH=8.5-9.5) | 200 | 200 | 200 | 200 |
| Dry solids basis | 20 | 20 | 20 | 20 |
| Water | 50 | 50 | 50 | 50 |
| (b) Reactant-aqueous solution: | | | | |
| 10% sulfuric acid | 6.8 | 6.8 | 6.8 | 6.8 |
| Silica slurry, pH | 7 | 7 | 7 | 7 |
| (c) Treated silica pigment: | | | | |
| Filtered (X) | X | X | X | X |
| Filter cake [1] | 162 | 162 | 162 | 162 |
| (B) Processing oil: | | | | |
| Processing oil [2] | 20 | | | |
| 28% aqueous ammonia | | | | |
| (C) Carbon black: Carbon black [3] | | 20 | 40 | 40 |
| (D) Combine (A), (B) and (C): Blend [4] | X | X | X | X |
| (E) Graft polymer solution: | | | | |
| (a) Polymer solution—Table IV: | | | | |
| Example 6 | 208 | | | |
| Example 7 | | 410 | | |
| Example 8 | | | 610 | |
| Example 9 | | | | 610 |
| Polymer content | 40 | 80 | 120 | 120 |
| (b) Solvent: | | | | |
| Hexane | 40 | 80 | | |
| Benzene | | | 120 | 120 |
| Antioxidant [5] | 0.8 | 1.6 | 2.4 | 2.4 |
| (F) Blending (D) plus (E): Blender,[6] min | 1 | 1 | 1 | 1 |
| (G) Solvent removal: [7] | | | | |
| Boiling water (X) | X | X | X | X |
| Silica separation into water phase | ([8]) | ([8]) | ([8]) | ([8]) |
| (H) Masterbatch: Dried (105° C.) (X) | X | X | X | X |

[1] Filter cake after washing.
[2] Sundex 2XH (a trademark product).
[3] Statex K (a trademark product).
[4] Waring Blender (a trademark product).
[5] The antioxidant is 2,2'-methylene-bis(4-methyl-6-t.-butylphenol).
[6] Waring Blender (a trademark product).
[7] The silica-graft polymer masterbatch is dropped into boiling water to vaporize the solvent and the polymer-silica masterbatch is recovered from the aqueous serum and dried.
[8] None.

The masterbatches prepared in accordance with the present invention may be compounded with vulcanizing ingredients and vulcanized by any suitable recipe (e.g. the recipe set forth in Table I, above) to form useful vulcanizates.

From the foregoing disclosure, it will be appreciated, inter alia, that the present invention improves elastomer-silica pigment masterbatches by forming the same with elastomers provided with certain substituent groups improving the compatibility of the elastomer with the aqueously wet silica pigment.

In certain co-pending applications filed concurrently herewith, different modes of improving elastomer-silica pigment masterbatches are provided by employing wet silica pigment rendered more compatible with elastomers by combining with the wet silica pigment certain conditioning materials.

To maintain clear lines of division between the co-pending applications the claims of this application recite, and rely for patentability on, only its own improvements, without prejudice to their applicability to processes or products employing such improvements along with a different improvement disclosed in one of said co-pending applications.

Also, while there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:

1. A process for the curbing of silica pigment losses and the promotion of uniformity of product in the preparation of a silica pigment-elastomer masterbatch from
   (a) aqueously wet silica pigment and
   (b) a solvent dispersion of elastomer, which process comprises the steps of:
   (c) providing 5 to 75 parts by weight, dry basis, of aqueously wet hydrated silica pigment precipitate which has a bound alkali content in the range of 0.1 to 10% by weight as $Na_2O$; which has been prepared by precipitation from an aqueous solution of alkali-metal silicate with the aid of carbon dioxide; and which has continuously been maintained in an aqueously wet state without having been dried therefrom after its precipitation;
   (d) providing an organic solvent dispersion containing 100 parts, dry basis by weight, of elastomer, said elastomer containing 0.1% to 20% by weight of nitrogen in the form of substitutent groups selected from the primary amine, secondary amine, tertiary amine, quaternary ammonium, and amide groups and being essentially free of hydroxyl groups; and said solvent being essentially water immiscible;
   (e) providing, when used in step (f), reactant selected from the class consisting of the members of the following groups: Group (I), the water soluble salts of aluminum or zinc; Group (II), the water soluble salts of the alkaline earth metals; Group (III), the water soluble acids; and Group (IV), combinations of any two or more members of the foregoing groups;
   (f) combining the wet silica pigment provided by step (c) with from 0 to at least a stoichiometric equivalent, based on the alkalinity of the silica pigment, of reactant provided by step (e); thereby to provide a wet silica pigment for use in step (g);
   (g) intimately mixing (1) the wet silica pigment provided for use by step (f), (2) from 0 to 75 parts by weight of carbon black with the limitation that the total of silica pigment and carbon black, dry basis, not exceed 80 parts by weight, (3) from 0 to 45 parts by weight of processing oil, and (4) the solvent dispersion of nitrogenous elastomer provided by step (d), and
   (h) separating the volatiles from the resulting masterbatch.

2. A process for preparing a masterbatch from wet silica pigment and a solvent dispersion of elastomer as claimed in claim 1, wherein the solvent dispersion provided in step (d) is a dispersion of grafted elastomer prepared from a solvent dispersion of precursor elastomer by adding to such solvent dispersion of precursor elastomer at least 0.1% by weight, based on the precursor elastomer content, of nitrogen in the form of vinylidene monomer material selected from the vinylidene monomers that are primary amine, secondary amine, tertiary amine, quaternary ammonium or amide compounds, and polymerizing said grafting monomer material.

3. A process for preparing a masterbatch from wet silica pigment and a solvent dispersion of elastomer as claimed in claim 1, wherein the solvent dispersed elastomer provided in step (d) comprises quaternary ammonium groups.

4. A process for preparing a masterbatch from wet silica pigment and a solvent dispersion of elastomer as claimed in claim 1, wherein the solvent dispersed elastomer provided in step (d) comprises amine groups.

5. A process for preparing a master batch from wet silica pigment and a solvent dispersion of elastomer as claimed in claim 1, wherein the solvent dispersed elastomer provided in step (d) comprises amide groups.

6. A process for preparing a masterbatch from wet silica pigment and a solvent dispersion of elastomer as claimed in claim 1, wherein the solvent dispersed elastomer provided by step (d) is prepared with vinylidene monomer material selected from the monomers which are quaternary ammonium compounds.

7. A process for preparing a masterbatch from wet silica pigment and a solvent dispersion of elastomer as claimed in claim 1, wherein the solvent dispersed elastomer provided in step (d) is prepared with vinylidene monomer material selected from the vinylidene monomers which are amine compounds, and at least a part of the resulting amine groups of the polymer are converted to quaternary ammonium groups by a process comprising treatment with a quaternizing agent, prior to inclusion of the polymer in the combination of step (g).

8. A process as claimed in claim 1, in which there is combined with the wet silica pigment and nitrogen group containing elastomer in step (g) at least 5 parts by weight of processing oil.

9. A process as claimed in claim 1, in which there is combined with the wet silica pigment and nitrogen group containing elastomer in step (g) at least 5 parts by weight of carbon black.

References Cited

UNITED STATES PATENTS

| | | | |
|---|---|---|---|
| 3,244,660 | 4/1966 | Herold | 260—29.7 |
| 2,964,490 | 12/1960 | Howland | 260—41.5 |
| 3,172,726 | 3/1965 | Burke et al. | 23—182 |
| 3,250,594 | 3/1966 | Burke et al. | 23—182 |
| 3,085,074 | 4/1963 | Burke et al. | 260—29.7 |
| 2,821,232 | 1/1958 | Wolf | 152—330 |
| 3,081,276 | 3/1963 | Synder | 260—33.6 |

MORRIS LIEBMAN, Primary Examiner

J. H. DERRINGTON, Assistant Examiner

U.S. Cl. X.R.

260—41 A 41 R, 41.5 A, 41.5 R, 41.5 MP